US007243109B2

(12) United States Patent
Omega et al.

(10) Patent No.: US 7,243,109 B2
(45) Date of Patent: Jul. 10, 2007

(54) SCHEME FOR CREATING A RANKED SUBJECT MATTER EXPERT INDEX

(75) Inventors: Noel S. Omega, Panorama City, CA (US); Paul B. Gloger, San Marino, CA (US); Daniel W. Manchala, Torrance, CA (US); John C. Wenn, II, Redondo Beach, CA (US); Leonid Orlov, Hermosa Beach, CA (US); Yoon J. Jhong, Los Angeles, CA (US); Youngseok Seo, Fullerton, CA (US)

(73) Assignee: Xerox Corporation, Stamford, CT (US)

( * ) Notice: Subject to any disclaimer, the term of this patent is extended or adjusted under 35 U.S.C. 154(b) by 507 days.

(21) Appl. No.: 10/761,053

(22) Filed: Jan. 20, 2004

(65) Prior Publication Data

US 2005/0165780 A1 Jul. 28, 2005

(51) Int. Cl.
*G06F 17/00* (2006.01)
(52) U.S. Cl. .......................... 707/102; 707/1; 715/500
(58) Field of Classification Search ............... 707/1–3; 715/500
See application file for complete search history.

(56) References Cited

U.S. PATENT DOCUMENTS

| 2002/0049774 | A1 | 4/2002 | Ritzel |
| 2003/0105769 | A1* | 6/2003 | Harris ......................... 707/102 |
| 2004/0088303 | A1* | 5/2004 | Elder et al. ................. 707/100 |
| 2004/0111467 | A1* | 6/2004 | Willis ......................... 709/203 |
| 2006/0129538 | A1* | 6/2006 | Baader et al. ................ 707/3 |

OTHER PUBLICATIONS

"OCLC adds NetFirst Internet database to its First . . . ," Information Today, 1996, p. 66, vol. 13.
"Novell Inc is offering a free software program," Newsbytes News Network, 1995.
"WordCheck/RA" (product name), Information Analytics (company), Mar. 2003.
"Nportal Server" (product name), Nstein Technologies Inc. (company), Mar. 2003.
Johnson, David B., et al., "Methods for domain-specific . . . ," 2000, p. 3689, vol. 61-07B, UCLA.
Quiroga. Luz Marinaz, "Personalized information org.: . . . ," 1999, p. 3830, vol. 60-11A, Indiana U.
White, R. W., et al., "Finding relevant documents . . . ," 2002, p. 57-64, Proceedings of SIGIR 2002.
Csato, E., "Electronic documents: . . . ," 2002, p. 303-11, vol. 49, Tudomanyos es Muszaki Tajekoztat.
Hsiao-Tieh Pu, "Subject categorization . . . ," 2002, p. 617-30, vol. 53, J. Am. Soc. Inf. Sci. Techno.

(Continued)

*Primary Examiner*—Alford W. Kindred
(74) *Attorney, Agent, or Firm*—Maginot, Moore & Beck

(57) ABSTRACT

A method of organizing electronic document-related information at least includes generating a collection of electronic documents, forming from the collection, at least one cluster of documents based upon a user's selection of a subject, and determining for each author of documents in the cluster, the number of times each the author is an author of a document corresponding to the subject. The authors are ranked and presented to the user in the form of an index. The ranked index can be interpreted as a ranking of subject matter experts.

23 Claims, 3 Drawing Sheets

OTHER PUBLICATIONS

Fong, A.C.M., "Effective techniques for automatic . . . " 2002, p. 4-18, vol. 26, Online Inf. Rev.

Roussinov, D., "Interactive Internet search . . . ," Proceedings of SIGIR '99, 1999, p. 289-90.

Alsmeyer, D., "Collaborating in information space," Online Information 98, 1998, p. 31-37.

Clarke, Sarah J., "Search engines for the . . . " Journal of Internet Cataloging, Mar. 1, 2000, v2 n3/4.

* cited by examiner

SCHEME FOR CREATING A RANKED SUBJECT MATTER EXPERT INDEX

FIELD OF THE INVENTION

The present invention broadly relates to the categorization and indexing of electronic documents, such as those available on the World Wide Web. More particularly, the present invention relates to identifying authors and subject matter experts based upon analyses of electronic document collections.

BACKGROUND OF RELATED ART

The continued proliferation of information and information documents in the Information Age requires ever improved methods for the effective management, categorization and document retrieval. The ever-increasing size and complexity of information that can be retrieved through sources such as the World Wide Web, while bringing an amount of information to a user's fingertips previously unimagined, also brings a unique challenge to organizing the information in a useful way. Using the World Wide Web, an ordinary user may have the ability to, in some form or another, access a number approaching one billion documents.

Search engines exist to search Internet based information, as well as Intranet based information. Among the tasks often performed by such search engines, is to search a collection of documents (whether relatively small or gigantic) using key words or phrases or information categories. Forms of artificial intelligence may also be used to look for appropriate variations on the key words' or phrases relied upon by the user. Because there is no all-encompassing database that includes every document accessible via the World Wide Web, and because there is a great deal of linked information, the effective grouping of documents of interest to a particular user at a particular time is the subject of vigorous development efforts.

U.S. Pat. No. 6,038,574 issued to James E. Pitkow et al., and assigned to Xerox Corporation (the assignee of this Letters Patent) discloses methods and apparatuses for clustering documents and related subsets of documents (such as those which are accessed via hyperlinks) using co-citation analysis. The general approach of the Pitkow patent, which can be administered through search engines, is to:

[generate] a document collection; for each document, determine the frequency of linkage, i.e. the number of times it is linked to by another document in the collection[;] threshold the documents based on some minimum frequency of linkage[;] create a list of pairs of documents that are linked to by the same document so that each of the pairs of documents has a count of the number of times (the co-citation frequency) that they were both linked to by another document[;] and cluster pairs using a suitable co-citation clustering technique.

The aforementioned patent is hereby incorporated by reference.

As another example, U.S. Pat. No. 6,182,091 issued to James E. Pitkow and Peter L. Pirolli, and also assigned to Xerox Corporation discloses a method of clustering related documents by studying the link structure of the documents in a document collection. The approaches of the aforementioned patents are often used to form indexes presented to a user to help organize the information. For example, the index might purport to relay a degree of confidence that a particular document or a group of particular documents is related to the topic of information sought. The index might indicate how often the retrieved documents have been previously retrieved or accessed, giving a measure of the importance others have placed on particular documents.

A number of other techniques have been used to cluster related documents. Additional discussion and background appears in, for example, U.S. patent application Ser. No. 09/922,700 filed Aug. 7, 2001 by Gary M. Oosta for "Methods for Document Indexing and Analysis."

In addition to finding documents on a particular subject, there is also sometimes a need to find commentators or authorities on particular subjects. For example, research paper and dissertation writers may wish to find articles of those eminent in particular fields, and further, may wish to discover some degree of information about the relative eminence of one author compared with another. As a further example, those seeking to employ expert witnesses may wish to do so at least partially based on the extend to which potential expert witnesses have published articles, books, papers, etc.

Notwithstanding the many approaches to clustering related documents, there currently exists no mechanized prior art approach to rank authors of documents so as to indicate from a search of documents, the degree to which particular authors may be considered subject matter experts (SMEs).

SUMMARY

In view of the above-identified limitations of the prior art, the present invention provides a method of organizing electronic document-related information that at least includes generating a collection of electronic documents, forming from the collection, at least one cluster of documents based upon a user's selection of a subject, and determining for each author of documents in the cluster, the number of times each the author is an author of a document corresponding to the subject. The authors are ranked and presented to the user in the form of an index. The ranked index can be interpreted as a ranking of subject matter experts.

The present invention also provides a system for organizing electronic document-related information. The system at least includes: an electronic document collection generator adapted to generate a collection of electronic documents; a document cluster former adapted to form from the collection, at least one cluster of documents based upon a user's selection of a subject; an author counter adapted to count and output for each author of documents in the cluster, the number of times each the author is an author of a document corresponding to the subject; an author ranker adapted to rank each the author according to the output of the author counter; and an author indexer adapted to present the results of the author ranker in the form of an index.

The majority of the steps in the present-inventive method are performed by a search engine. However, it is possible to perform some or all of these steps using another instrumentality interfacing between users and document sources.

BRIEF DESCRIPTION OF THE DRAWINGS

Features of the present invention will become apparent to those skilled in the art from the following description with reference to the drawings, in which.

DETAILED DESCRIPTION

Approach Summary

Figure 1:
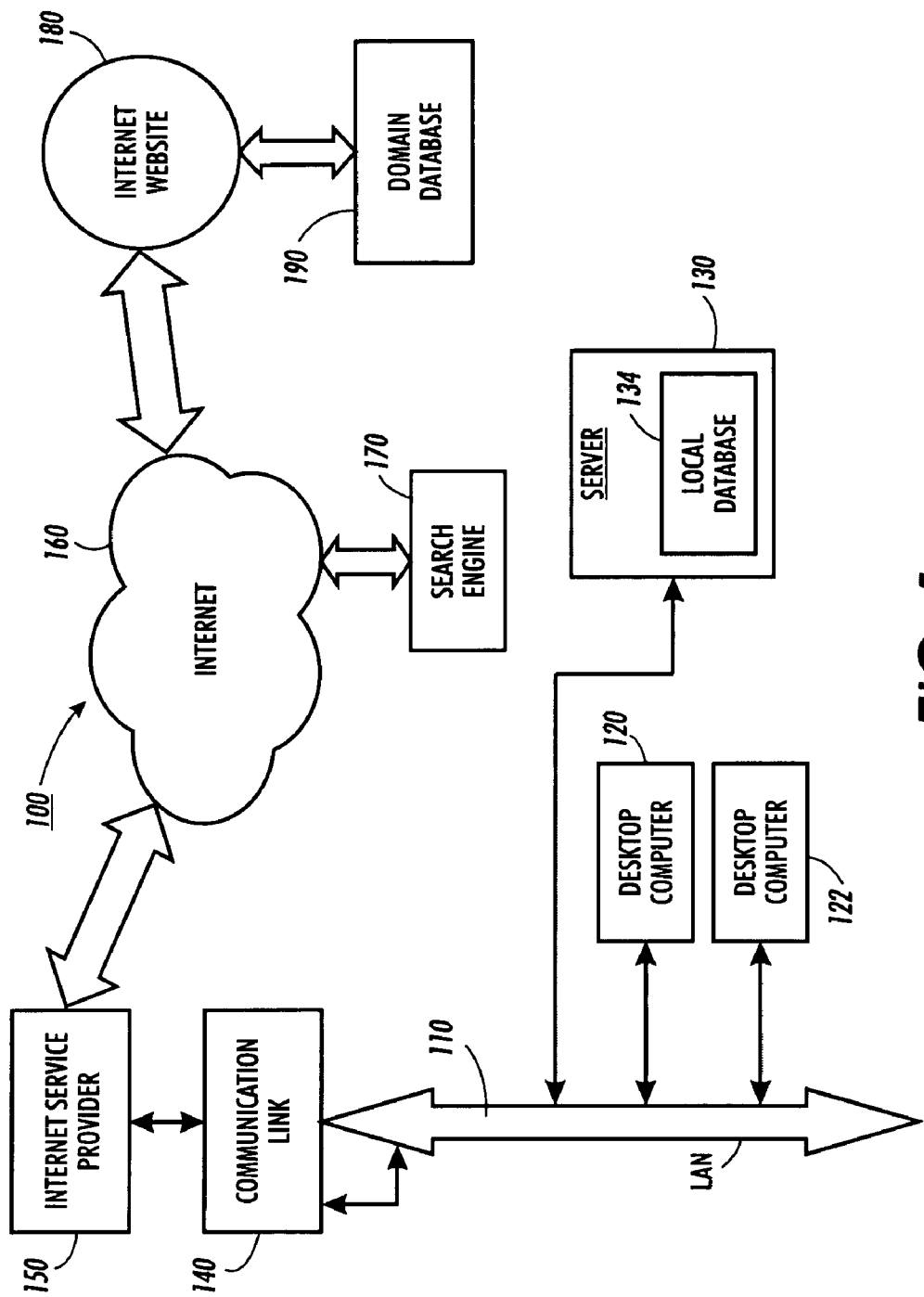
FIG. 1 is a general schematic diagram of a system capable of carrying out the present-inventive method for organizing electronic document information.

The present invention is a novel approach to identify authors and subject matter experts pertaining to particular subjects and topics of interest. The authors of documents in a cluster of documents taken from a large document collection are listed and ranked in an index according to the number of documents in the original cluster the author has written or co-written, and further the number of documents linked to the clustered documents, that the author has written or co-written, and so forth, until the linked documents are either exhausted, or the number of authors or documents considered has reached a threshold amount. The compilation of the ranked index can be interpreted, if desired, as a degree of expertise of a particular author in a particular subject (i.e., subject matter expertise), based upon the number of times an author has either written or co-written a document, or has one of his/her documents cited in another document pertaining to the same subject.

The present-inventive approach is compatible for searching very large document collections, such as the World Wide Web in general, a smaller document collection accessible via a particular domain on the World Wide Web, an Intranet based document collection, or even a local collection accessible through servers and the like.

System Overview

The system 100 contains the nominal components of a system capable of the novel author and subject matter expert ranked index method of the present invention. While the system 100 is probably more typical for a corporate setting, those skilled in the art will appreciate that it can be modified for a non-corporate environment.

A Local Area Network (LAN) 110 provides functional connectivity for local net-worked components such as individual computers 120, 122, and a server 130. When the present-inventive approach is used for a local collection of documents, the documents can be stored in a local database 134 that either physically resides on the server 134, or is coupled to the server. To use the present-inventive approach on documents accessible via a Wide Area Network (WAN), the system includes a communication link 140 which can connect the LAN to the Internet 160 via an Internet Service Provider (ISP) 150. Those skilled in the art will appreciate that the system 100 need not necessarily employ an external ISP, provided the functions are handled internal to an organization.

The present-inventive approach is subsumed by a search engine 170. The search engine employs the algorithm described infra with respect to FIG. 2.

An Internet website 180 can be used to access a domain database 190 for searching documents available through the website.

Thus has been described a flexible system 100 capable of clustering documents from a collection of documents that can be locally or remotely accessed. The specific steps used to practice the present-inventive method are described below, with reference to FIG. 2.

Algorithm Description

Figure 2:
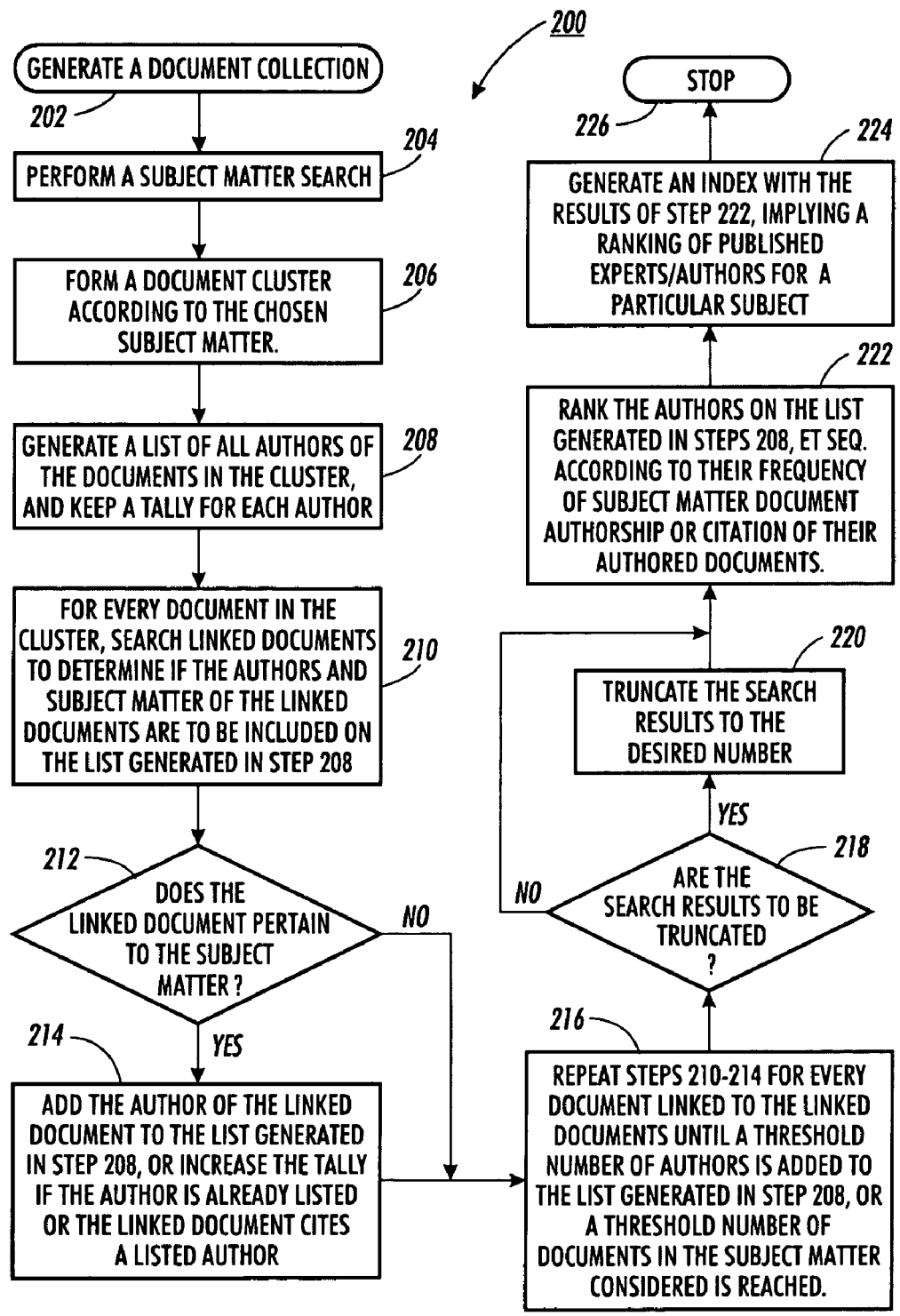
FIG. 2 is a general workflow diagram of the present-inventive method for organizing electronic document information.

The first step of the algorithm 200 in FIG. 2 is to generate a collection of documents. As was previously mentioned, the document collection can be generated via the World Wide Web, intranets, or more local sources. In Steps 204 and 206 a subject matter search is performed, followed by a clustering of related documents. The clustering can be performed using any number of methods, including the aforementioned U.S. Pat. No. 6,038,574 issued to James E. Pitkow et al. The reader is referred to that patent for discussions on particular techniques that are compatible with the present invention.

In Step 208 the algorithm 200 generates a list of all who are authors of documents in the document cluster. The document authors are determined by examining document header information, metadata, or by using artificial intelligence. For example, a simple artificial intelligence approach might be to consider document characters that immediately follow words such as "by."

Not only is the immediate document cluster searched for authors, but documents linked (such as via hyperlink) to the clustered documents are also searched (Step 210). If the linked documents pertain to the defined subject matter (Step 212), the authors of the linked documents are added to the list generated in Step 208 (Step 214). Along with the list of all authors is a tally for each author for documents published pertaining to the identified subject matter. Not only is the tally for each author increased each time a linked document is authored by the particular author, but it is also increased each time a linked document pertaining to the identified subject matter cites a document written by the particular author (Step 214).

In accordance with Step 216, the algorithm 200 repeats Steps 210 through 214 until either all of the clustered and linked documents are analyzed, or until a threshold number of documents or authors has been considered. For example, the search engine may be instructed to analyze the top one thousand documents recently retrieved pertaining to a particular subject, or perhaps the top one hundred authors cited for a particular subject. If the user later decides to truncate the search results because they are unmanageable, for example, he or she can instruct the search engine to do so in Steps 218 and 220.

The authors are ranked according the frequency in which either they have authored documents pertaining to the subject matter in question, and the frequency in which other documents pertaining to the subject matter in question refer to relevant documents by the authors (Step 222). The algorithm generates a ranked index with the results of Step 222, which can be interpreted by a user as a ranking of subject matter experts (SMEs) for published authors regarding a particular subject (Step 224).

The algorithm ends in Step 226.

Figure 3:
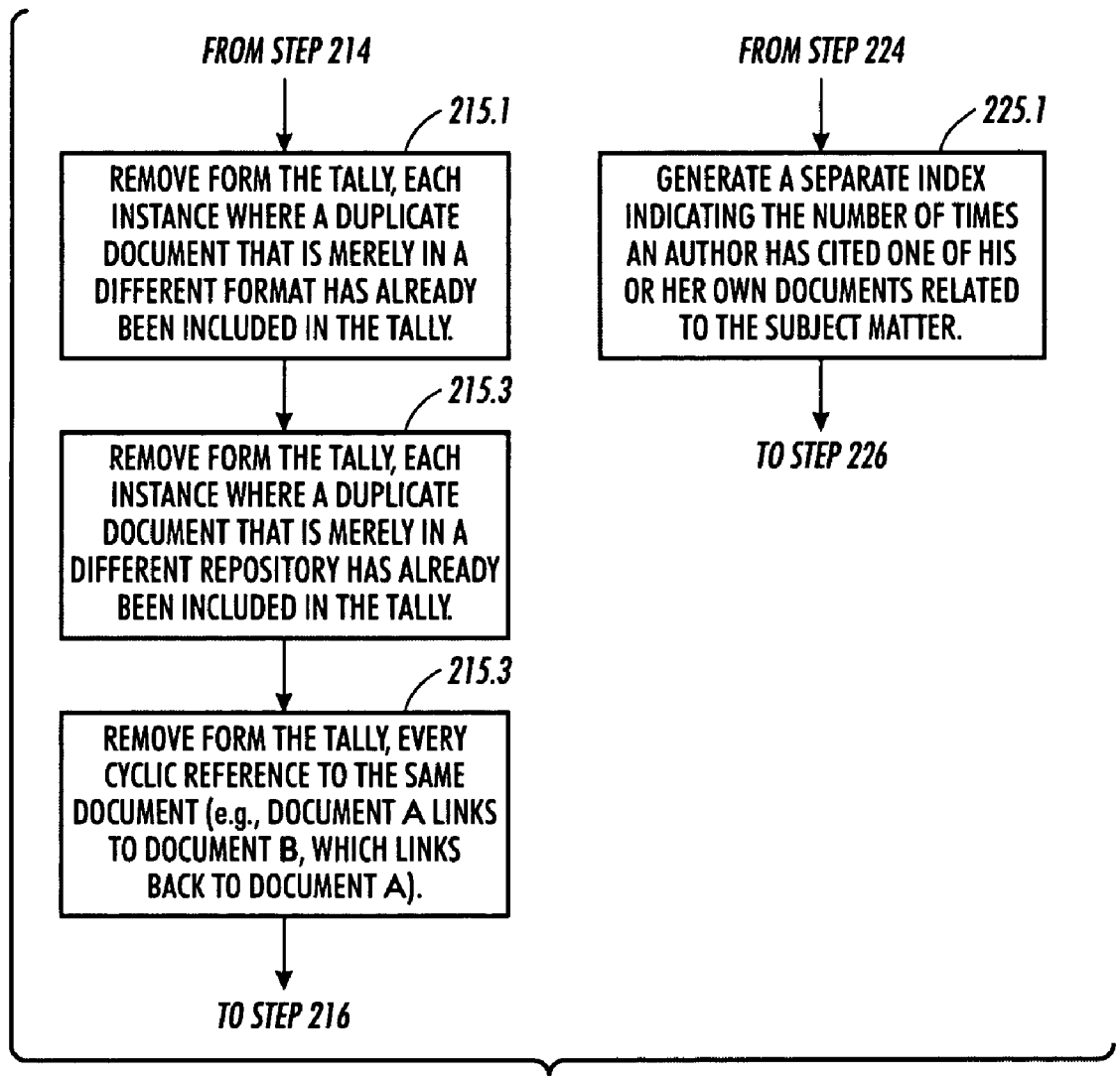
FIG. 3 contains some steps used in alternate versions of the workflow of the present-inventive method for organizing electronic document information.

An alternate embodiment of the algorithm 200 incorporates the steps shown in FIG. 3. Some steps such as 215.1-215.5 are spliced between Steps 214 and 216, while Step 225.1 is spliced between Steps 224 and 226.

In Step 215.1, the tally is not increased when the same document is again encountered that happens to be in a different format. For example, if a previously encountered document in HTML format citing a work by an author being considered has already been counted, a subsequent encounter of the same document in a different format such as Word, Postscript, PDF, etc., will not increase the tally.

Likewise, the tally will not be increased for previously encountered documents that are simply stored in different repositories (Step 215.3). Further, the tally will not be increased for cyclic references (Step 215.5). A cyclic reference would be, for example, document A, where document A links to document B, and document B links back to document A.

So the that information presented to a user will not be skewed by self-serving citations that may give a distorted view of the level of subject matter expertise of authors, a separate index can be prepared that shows the number of times that a particular author links to others of his/her own works (Step 225.1). Alternately, the index prepared in Step 224 can contain notations by each author indicating the number of self references included in the tally.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of organizing electronic document-related information comprising:
    forming at least one cluster of electronic documents based upon a user's selection of a subject;
    identifying each author of the documents in said cluster and accumulating a number of times each identified author is an author of a document in the cluster of electronic documents corresponding to said subject;
    ranking each identified author according to the number accumulated for each identified author; and
    presenting the rankings for the identified authors in an index form.

2. The method of claim 1, further comprising;
    searching documents hyperlinked to the cluster of electronic documents; and
    modifying the number of times accumulated for an author with a number of citations for the identified author in the hyperlinked documents pertaining to said subject.

3. The method of claim 1, further comprising;
    searching documents hyperlinked to the cluster of electronic documents; and
    modifying the number of times accumulated for an identified author by a number of times the identified author is an author of a hyperlinked document pertaining to said subject.

4. The method of claim 1, wherein said cluster of electronic documents is formed from documents stored at a specified World Wide Web domain.

5. The method of claim 1, wherein said cluster of electronic documents is formed from documents stored at a specified Intranet.

6. The method of claim 1, wherein said cluster of electronic documents is formed from documents managed by an identified server.

7. The method of claim 1, wherein said cluster of electronic documents is formed from a specified directory of documents.

8. The method of claim 1, wherein said cluster of electronic documents is formed from documents stored on the World Wide Web.

9. The method of claim 1, further comprising:
    receiving user input specifying a frequency of citation threshold; and
    excluding an author from the index when the accumulated number of times for an identified author is less than said specified frequency of citation threshold.

10. The method of claim 1, further comprising:
    excluding from said accumulated number of times for an identified author documents that are redundant in content but stored in a format different than the format of a document previously counted.

11. The method of claim 1, further comprising:
    excluding from said accumulated number documents that are redundant in content but stored in a repository different than a repository in which a document previously counted is stored.

12. The method of claim 2, further comprising:
    excluding from said accumulated number documents that cite documents previously counted.

13. The method of claim 1, further comprising:
    forming a second index for each identified author, the second index containing a number of times a document corresponding to the selected subject and having the same author is cited in another document by the identified author.

14. A system for organizing electronic document-related information comprising:
    a document cluster former for forming at least one cluster of electronic documents based upon a user's selection of a subject;
    an author counter for identifying each author of a document in said cluster and accumulating the number of times each identified author is an author of a document in the cluster corresponding to said subject;
    an author ranker for ranking each identified author according to the number of times accumulated for the identified author; and
    an author indexer for sorting the identified authors into an index.

15. The system of claim 14, wherein a subject matter expertise of the identified authors corresponds to the sorting of the identified authors in the index.

16. The system of claim 14, further comprising:
    a hyperlink document searcher for searching documents hyperlinked to the cluster of documents; and
    the author counter counts a number of times an identified author is cited in a hyperlinked document pertaining to said subject.

17. The system of claim 14, further comprising:
    a hyperlink document searcher for searching documents hyperlinked to the cluster of documents; and
    the author counter counts a number of times an identified author is an author of a hyperlinked document pertaining to said subject.

18. The system of claim 14, wherein said cluster of electronic documents is formed from documents stored at a specified World Wide Web domain.

19. The system of claim 14, wherein said cluster of electronic documents is formed from documents stored on a specified Intranet.

20. The system of claim 14, wherein said cluster of electronic documents is formed from documents managed by a specified server.

21. The system of claim 14, wherein said cluster of electronic documents is formed from documents stored in a specified directory.

22. The system of claim 14, wherein said cluster of electronic documents is formed from documents stored on the World Wide Web.

23. The system of claim 14, further comprising:
    a frequency of citation threshold receiver for receiving a frequency of citation threshold; and
    the author indexer excludes an identified author from the index when the accumulated number of times for an identified author is less than the received frequency of citation threshold.

* * * * *